United States Patent Office 3,049,420
Patented Aug. 14, 1962

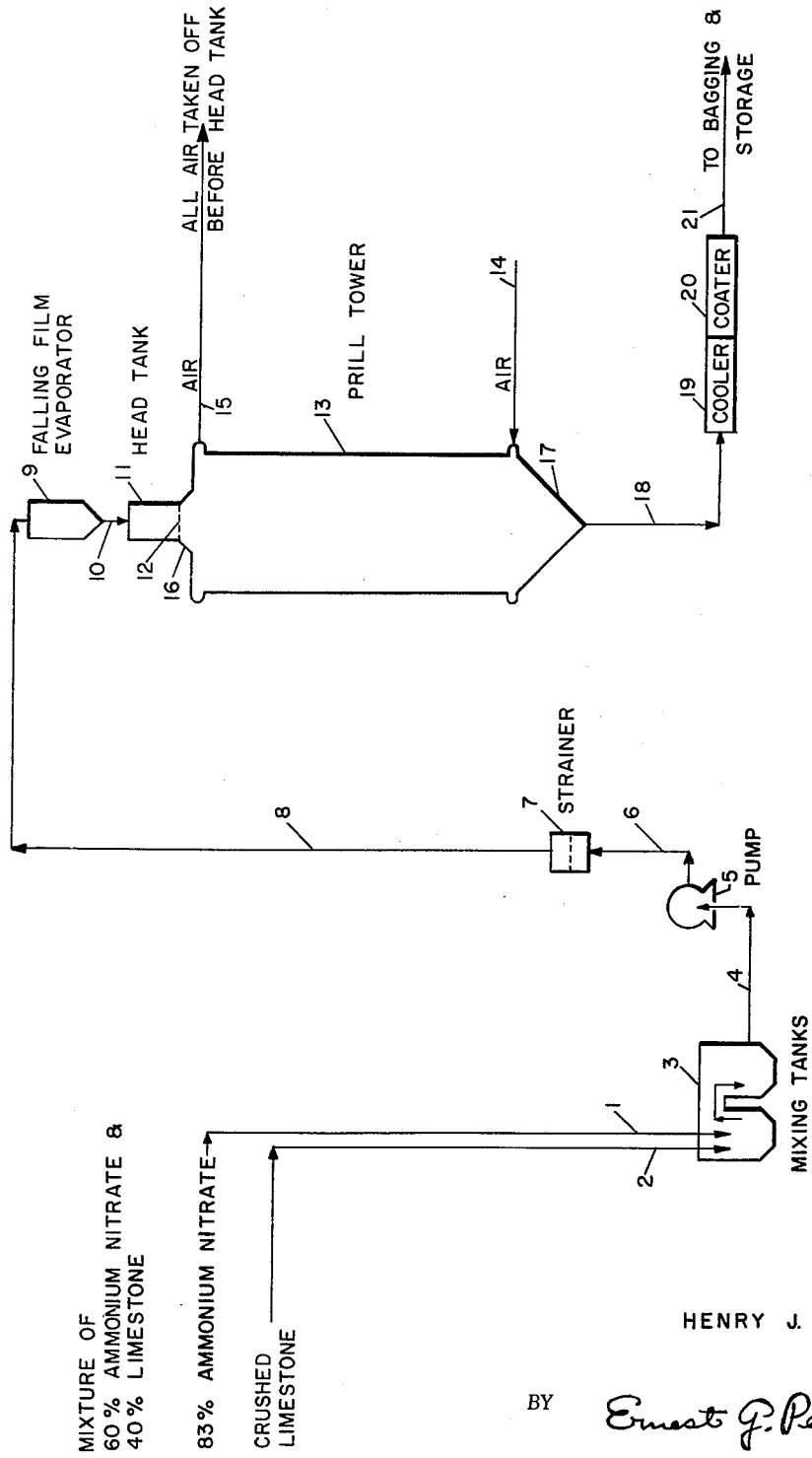

3,049,420
PRILLED NITROGENOUS COMPOSITION
Henry J. Weiland, Birmingham, Ala., assignor to Hercules Powder Company, Wilmington, Del., a corporation of Delaware
Filed Nov. 12, 1959, Ser. No. 852,393
6 Claims. (Cl. 71—64)

This invention relates to the production of prilled nitrogenous compositions particularly suitable as fertilizer and, more specifically, to a prilled composition containing ammonium nitrate and calcium carbonate material.

Fertilizer compositions containing ammonium nitrate and limestone, which is pulverized rock consisting mainly of calcium carbonate, have long been known in the art and are commonly referred to as Cal-Nitro or Nitro-Chalk. However, these compositions heretofore have been prepared by granulating or milling a mixture of the limestone or calcium carbonate material with aqueous ammonium nitrate usually from about 90% concentration to maximum concentration of the ammonium nitrate which is about 97%. Concentrations below 90% have been avoided since aqueous contents of more than 10% increase drying difficulties and tend to promote reaction between the ammonium nitrate and the limestone or calcium carbonate material in accordance with prior art procedures. The compositions so produced, regardless of procedure including technique for granulation, are of relatively weak physical strength in respect to crushing and, additionally, must be dried after formation into solid granules. Moreover, to eliminate drying, it has been proposed to heat the limstone or calcium carbonate material and mix it with an anhydrous melt of ammonium nitrate. However, this technique results in undue decomposition of the ammonium nitrate with formation of detectable amounts of calcium and/or magnesium nitrate, as the case may be, and detracts from the practicability of the process and the quality of the end product composition.

More recently, in order to obtain ammonium nitrate granules with improved physical characteristics, a process known to the art as "prilling" was developed. This process is described in U.S. Patent 2,402,192 to Williams et al. The ammonium nitrate granules prodced from this process are free-flowing, strong, dense and hard and they are obtained in relative uniform size as well as possessing a reduced tendency to cake and harden when stored for considerable periods of time. This process, however, requires additional drying after prilling and it is not directed to the production of mixed fertilizers. Furthermore, it has been disclosed that in prilling, great care must be exercised in controlling the concentration of the ammonium nitrate. If concentrations less than about 94% are utilized, the moisture cannot be extracted readily from the cores of the prills without causing deterioration of the shells formed in the spraying step, while prills formed from highly concentrated solutions of about 97% or more contain a large central void which makes them less satisfactory as a fertilizer due to their weak physical strength in respect to crushing.

It is a primary object of the present invention to produce a prilled fertilizer composition while obviating the attendant disadvantages heretofore set forth. A further object of this invention is to provide a prilled composition essentially consisting of calcium carbonate material and ammonium nitrate which is characterized by improved physical properties and which may be utilized as a fertilizer or a blasting agent, where in the latter instance the calcium carbonate material is present in small amount. Other objects of the invention will appear hereinafter, the novel features and combinations being set forth in the appended claims.

Generally described, in accordance with the present invention there is provided a prilled nitrogenous composition and process for preparing same which comprises the following steps: preparing a suspension essentially consisting of finely divided calcium carbonate material in aqueous ammonium nitrate solution containing more than 10% water at a temperature above the melting point of said solution but not more than about 250° F.; passing the suspension to a falling film evaporator to convert it to a molten suspension substantially free of water; passing the molten suspension to a prilling tower to form solidified prills thereof; and recovering the solidified prills from the prilling tower.

A preferred embodiment of the invention has been chosen for purposes of illustration and description and is shown in the accompanying drawing wherein the process set forth is an example of plant-scale operation of the invention.

In the drawing, an aqueous solution of 83% ammonium nitrate and finely powdered dolomitic limestone are continuously fed through conduits 1 and 2, respectively, into mixing tanks 3 in proportion to give a mixture of 60% ammonium nitrate and 40% limestone by weight. The mixing tanks 3 are provided with suitable agitators and suitable heating means (not shown) to insure a uniform and intimate mixing of the ingredients. The temperature of mixing is not critical except insofar as the mixture should be maintained at a temperature above the melting point of the ammonium nitrate of specified strength being utilized but below about 250° F. since higher temperatures favor a reaction of the mixture. In the case of the aqueous solution of 83% ammonium nitrate as used herein, a temperature range of from about 200° F. to about 250° F. when using unheated finely divided dolomitic limestone having a particle size of substantially 100% through a 72-mesh sieve was found to give optimum results.

The suspension or slurry mixture from the mixing tanks 3 is passed through conduit 4 to a pump 5 from which the slurry is pumped through a conduit 6 to a strainer 7. The strainer 7 is utilized to remove any nonuniform lumps from the slurry as it passes therethrough. From the strainer 7 the slurry passes through a conduit 8 and into the top of a falling film evaporator 9. As designated, the evaporator 9 is of the falling film type such as disclosed in U.S. Patent 2,089,945 to J. D. Converse et al. The process involves causing a solution containing a compound and a volatile fluid to flow in the form of a continuously moving film over a heated surface countercurrent to a stream of heated inert gas while maintaining said surface at a temperature above the melting point of the compound in the inhydrous state and maintaining the rate of flow sufficiently rapid and the contact of the film with the heated surface sufficiently short to avoid decomposition of the compound, but sufficiently long to substantially dehydrate said compound. In the instant application of the falling film evaporator, it will be appreciated that the aqueous slurry mixture enters the top of the evaporator and as it descends in the form of a thin film, the aqueous content is progressively removed therefrom until at the bottom of the evaporator there is obtained a molten mixture or slurry substantially free from water. In accordance with the preferred embodiment of this invention, approximately 7,500 pounds per hour of the aqueous slurry mixture was fed to the evaporator 9 and the evaporator was heated with steam at a pressure of from 180 to 200 pounds per square inch while at the same time air preheated by steam at the same pressure was blown through the evaporator countercurrent to the descending slurry. This corresponded to a heated surface temperature of from about 375° to about 380° F.

and a heated inert gas temperature of from about 340° to about 365° F. which rendered the dehydrated mixture a molten slurry at the bottom of the evaporator.

The molten slurry from the bottom of the evaporator 9 was passed through a conduit 10 into a head tank 11. The head tank 11 was provided with suitable agitation and suitable heating means (not shown) to provide for passage of the molten slurry in the form of droplets through a prill plate 12 located at the bottom of the head tank. The head tank 11 was positioned concentrically on the top of a prill tower 13 which was provided with an air inlet 14 near the bottom thereof and an air outlet 15 near the top thereof for passing cooling air countercurrently to the descending droplets of the molten slurry. The prill tower 13 at the top thereof had a truncated conical section 16 which adjoined the bottom of the head tank 11. All air from the prill tower 13 was taken off before the head tank 11 so that the area immediately beneath the prill plate 12 formed a relatively uncooled quiescent zone for effective formation of the prill droplets.

The bottom of the prill tower 13 was formed into a conical section 17 for collection of the solidified prills at the base of the tower. The prills from the base of the tower were fed through a conduit 18 to a cooler 19 wherein they were further cooled before passing into a coater 20 for application of suitable coating agent. From the coater 20, the coated prills were fed through a conduit 21 to suitable bagging and storage facilities.

In accordance with the process hereinbefore described, production rates in the order of 75 tons per day of limed ammonium nitrate fertilizer have been attained. Moisture contents of the finished material have been consistently in the order of 0.2% or less. Moreover, high quality finished products were obtained having good uniformity in respect to size and containing less than 1% fines. The prills thus obtained were more particularly characterized by a rough surface and improved physical properties in respect to strength, density, hardness, and resistance to moisture pick-up, as compared to any known limed ammonium nitrate products being commercially produced.

Although it is not intended that the invention shall be limited to any particular theory of operation, it appears that in intimately mixing aqueous ammonium nitrate solutions containing more than 10% water with finely divided limestone or other calcium carbonate material, a completely homogeneous system is obtained and that this homogeneity is retained as the material passes from the evaporator to the head tank of the prill tower. Moreover, in utilizing the falling film evaporator wherein the mixture is exposed to drying in the form of a very thin film, the moisture on being withdrawn during the dehydration procedure is expelled from the mother liquor relatively free of the formation of large pores as obtained in conventional granulation or prilling followed with drying. Thus, an improved strong, dense and hard product is formed in which the prill has a rough surface even when as little as 1% by weight of calcium carbonate material is used. Furthermore, since the initial mixing of the ammonium nitrate and limestone or other calcium carbonate material is conducted at relatively mild temperatures as well as the evaporation step, there is no interaction between the ammonium nitrate and the calcium carbonate material and there is no detectable amount of calcium and/or magnesium nitrate in the finished product. In other processes using more severe conditions for initial mixing and evaporation and using limestone, for example, detectable amounts of calcium nitrate in the order of ½ of 1% or more are formed which detract from the moisture resistance of the finished product.

From the foregoing it is evident that there are numerous factors which will influence conditions for the most satisfactory operation of the invention, the actual limits of which cannot be established except by a detailed study of each set of raw materials and the intermediate and finished products involved. For example, the term "calcium carbonate material" as used herein is meant to include a variety of materials such as limestones, which consist mainly of calcium carbonate ($CaCO_3$) commonly in the form of the mineral calcite, and which differ considerably in their purity, hardness, color, degree of compactness, and other characteristics. Most limestones contain magnesium carbonate ($MgCO_3$), and when 10% or more of magnesium carbonate is present they are called dolomitic limestones as set forth in the example, and when composed of equimolecular proportions of calcium carbonate and magnesium carbonate they are called dolomites ($MgCO_3 \cdot CaCO_3$), which when pure contain 45.7% of magnesium carbonate. Accordingly, since calcium carbonate is the main liming constituent within the purview of this invention, other types of calcium carbonate material may be utilized such as that obtained by pulverizing marl or oyster shells or precipitated calcium carbonate, or by-product calcium carbonate such as that obtained from preparation of ammonium sulfate from ammonium carbonate and calcium sulfate and which therefore contains a small amount of ammonium sulfate, or other finely divided calcium carbonate material containing minor proportions of other material, including trace elements, inert to ammonium nitrate and suitable in fertilizers. The particle size of the finely divided calcium carbonate material may be from about 0.001 to about 0.01 inch. Furthermore, ratios of calcium carbonate material to ammonium nitrate may be varied considerably, it being recognized that 30 parts of dry calcium carbonate material to 70 parts of ammonium nitrate will give a good neutralized fertilizer but that ratios of 40:60 and 50:50 are more satisfactory while a ratio in excess of 60:40 excessively decreases the nitrogen content of the mixture. On the other hand, where substantially neutralized products are not desired, the calcium carbonate material may be employed in amount of from about 1 to about 3% by weight whereby the product obtained may be utilized as high nitrogen content fertilizer or it may be utilized as blasting agent. The concentration of the ammonium nitrate may be varied from about 70 to about 90%. However, to insure intimate mixing balanced against the amount of water to be removed, a concentration of from about 80 to about 85% is preferred. The temperatures utilized in mixing the calcium carbonate material with the ammonium nitrate may be from about 180° to about 250° F., the main object being to maintain the mixture above the melting point of the ammonium nitrate of the specific concentration utilized and not exceeding about 250° F., at which temperature the ammonium nitrate and calcium carbonate material tend to react.

In the evaporation step, using the concentrations of ammonium nitrate given, the falling film evaporator may be operated at a temperature of from about 375° to about 385° F. for the heated surface of the evaporator and at a temperature of from about 340° to about 365° F. for the countercurrent stream of inert gas. The prill tower in accordance with this invention may be operated with a head tank temperature of from about 350° to about 385° F. from which the prills are discharged into the prill tower having countercurrent cooling gas passing therethrough, which gas may have an initial temperature of from about 40° to about 100° F. The prill plate, of course, contains apertures therethrough which size may be from about .020 to about .050 inch depending on the size of end product prills desired. Means such as coating and coating agents are not further described, since their application and choice are well within the province of persons skilled in the art. Ordinarily, however, for fertilizer utility coating agents such as clay or diatomaceous earth are used, while for blasting agent utility coating agents such as PRP (petroleum, rosin, petrolatum) and pregelatinized starch products are commonly used. Regardless of the type of coating agent desired, the rough surface of the prills of this invention afford improvement in adherence and amount of coating agent applied.

The advantages of the invention are multifold: the physical form of the finished product is superior to that of limed ammonium nitrate fertilizers heretofore available on the market; decomposition of the product by interaction between ammonium nitrate and the calcium carbonate material is reduced to the point where no detectable amounts of calcium and/or magnesium nitrate may be found int he finished product; mixing the calcium carbonate material with high water content, relatively cool ammonium nitrate insures uniformity; solidifying the mixture of calcium carbonate material with an anhydrous melt of ammonium nitrate eliminates the necessity of high towers and drying the material after it has been converted into the solid prilled form; all materials utilized in the process are handled at relatively low temperatures which is safer for plant personnel; the rough surface of the prilled material provides for the application of coating agent in a facile manner; and moisture ranges desired by the industry are obtained in a single operation in contrast with previously employed processes which involve drying of the material after it has been formed into a solid mass.

It will be seen, therefore, that this invention actually may be carried out by the use of various modifications and changes without departing from its spirit and scope.

What I claim and desire to protect by Letters Patent is:

1. A process for producing a prilled nitrogenous composition, which comprises in combination the following steps in the order named: preparing a suspension essentially consisting of finely divided calcium carbonate material in aqueous ammonium nitrate solution containing more than 10% water at a temperature above the melting point of said solution but not more than about 250° F., and on an anhydrous weight basis, containing from about 1 percent to about 60 percent of said finely divided calcium carbonate; passing the suspension to a falling film evaporator to convert it to a molten suspension substantially free of water in accordance with the steps of (1) passing said suspension downwardly in said evaporator in form of a continuously moving film over a surface while maintaining the temperature of said surface above the melting point of said ammonium nitrate, (2) passing a stream of inert gas through the said evaporator, at an initial temperature greater than the melting point of said ammonium nitrate, in countercurrent flow contact relation with said film, and (3) regulating the time of contact of said film with said surface and with said inert gas to a value sufficiently low as to substantially avoid decompositon of said ammonium nitrate and said calcium carbonate therein but sufficiently high to substantially completely dehydrate the said film; passing the molten suspension to a prilling tower to form solidified prills thereof; and recovering the solidified prills from the prilling tower in a substantially completely dehydrated state.

2. A process for producing a prilled nitrogenous composition which comprises in combination the following steps in the order named: preparing a suspension essentially consisting of finely divided calcium carbonate material in aqueous ammonium nitrate solution containing more than 10% water at a temperature above the melting point of said solution but not more than about 250° F., said calcium carbonate being present in amount of from about 30 to about 60% by weight, on an anhydrous basis; passing the suspension to a falling film evaporator to convert it to a molten suspension substantially free of water in accordance with the steps of (1) passing said suspension downwardly in said evaporator in form of a continuously moving film over a surface while maintaining the temperature of said surface above the melting point of said ammonium nitrate, (2) passing a stream of inert gas through the said evaporator, at an initial temperature greater than the melting point of said ammonium nitrate, in countercurrent flow contact relation with said film, and (3) regulating the time of contact of said film with said surface and with said inert gas to a value sufficiently low as to substantially avoid decomposition of said ammonium nitrate and said calcium carbonate therein but sufficiently high to substantially completely dehydrate the said film; passing the molten suspension to a prilling tower to form solidified prills thereof; and recovering the solidified prills from the prilling tower in a substantially completely dehydrated state.

3. A process for producing a prilled nitrogenous composition which comprises in combination the following steps in the order named: preparing a suspension essentially consisting of finely divided dolomitic limestone in aqueous ammonium nitrate solution containing more than 10% water at a temperature above the melting point of said solution but not more than about 250° F., said limestone being present in amount of about 40% by weight on an anhydrous basis; passing the suspension to a falling film evaporator to convert it to a molten suspension substantially free of water in accordance with the steps of (1) passing said suspension downwardly in said evaporator in form of a continuously moving film over a surface while maintaining the temperature of said surface above the melting point of said ammonium nitrate, (2) passing a stream of inert gas through the said evaporator, at an initial temperature greater than the melting point of said ammonium nitrate, in countercurrent flow contact relation with said film, and (3) regulating the time of contact of said film with said surface and with said inert gas to a value sufficiently low as to substantially avoid decomposition of said ammonium nitrate and said calcium carbonate therein but sufficiently high to substantially completely dehydrate the said film; passing the molten suspension to a prilling tower to form solidified prills thereof; recovering the solidified prills from the prilling tower, and said prills so recoveerd containing not more than 0.2 weight percent water.

4. A process for producing a prilled calcium carbonate and ammonium nitrate composition which comprises in combination the following steps in the order named: preparing a suspension essentially consisting of finely divided calcium carbonate material in aqueous ammonium nitrate solution containing more than 10% water at a temperature above the melting point of said solution but not more than about 250° F., said calcium carbonate material being present in amount of from about 1 to about 3% by weight, on an anhydrous basis; passing the suspension to a falling film evaporator to convert it to a molten suspension substantially free of water in accordance with the steps of (1) passing said suspension downwardly in said evaporator in form of a continuously moving film over a surface while maintaining the temperature of said surface above the melting point of said ammonium nitrate, (2) passing a stream of inert gas through the said evaporator, at an initial temperature greater than the melting point of said ammonium nitrate, in countercurrent flow contact relation with said film, and (3) regulating the time of contact of said film with said surface and with said inert gas to a value sufficiently low as to substantially avoid decomposition of said ammonium nitrate and said calcium carbonate therein but sufficiently high to substantially completely dehydrate the said film; passing the resulting anhydrous molten suspension to a prilling tower to form solidified prills thereof, whereby the resulting prills are substantially anhydrous; and recovering the solidified prills from the prilling tower.

5. A process for producing a prilled calcium carbonate and ammonium nitrate composition which comprises in combination the following steps in the order named:

preparing a suspension essentially consisting of finely divided dolomitic limestone in aqueous ammonium nitrate solution containing more than 10% water at a temperature above the melting point of said solution but not more than about 250° F., said limestone being present in amount of about 2% by weight, on anhydrous basis; passing the suspension to a falling film evaporator to convert it to a molten suspension substantially free of water in accordance with the steps of (1) passing said suspension downwardly in said evaporator in form of a continuously moving film over a surface while maintaining the temperature of said surface above the melting point of said ammonium nitrate, (2) passing a stream of inert gas through the said evaporator, at an initial temperature greater than the melting point of said ammonium nitrate, in countercurrent flow contact relation with said film, and (3) regulating the time of contact of said film with said surface and with said inert gas to a value sufficiently low as to substantially avoid decomposition of said ammonium nitrate and said calcium carbonate therein but sufficiently high to substantially completely dehydrate the said film; passing the resulting substantially anhydrous molten suspension to a prilling tower to form solidified prills thereof, whereby the resulting prill product is substantially anhydrous; and recovering the solidified prills from the prilling tower.

6. Prilled nitrogenous products formed in accordance with the following steps in the order named: preparing a suspension essentially consisting of finely divided calcium carbonate material in aqueous ammonium nitrate solution containing more than 10% water at a temperature above the melting point of said solution but not more than about 250° F. and, on an anhydrous weight basis, containing from about 1 percent to about 60 percent of said calcium carbonate; passing the suspension to a falling film evaporator to convert it to a molten suspension substantially free of water in accordance with the steps of (1) passing said suspension downwardly in said evaporator in form of a continuously moving film over a surface while maintaining the temperature of said surface above the melting point of said ammonium nitrate, (2) passing a stream of inert gas through the said evaporator, at an initial temperature greater than the melting point of said ammonium nitrate, in countercurrent flow contact relation with said film, and (3) regulating the time of contact of said film with said surface and with said inert gas to a value sufficiently low as to substantially avoid decomposition of said ammonium nitrate and said calcium carbonate therein but sufficiently high to substantially completely dehydrate the said film; passing the resulting substantially anhydrous molten suspension to a prilling tower to form solidified prills thereof, whereby the solidified prill product is substantially anhydrous; and recovering the solidified prills from the prilling tower.

References Cited in the file of this patent
UNITED STATES PATENTS

| | | |
|---|---|---|
| 2,079,324 | Krauch et al. | May 4, 1937 |
| 2,382,298 | Datin | Aug. 14, 1945 |
| 2,770,539 | Martenet | Nov. 13, 1956 |
| 2,773,753 | Stengel | Dec. 11, 1956 |
| 2,781,254 | Munekata et al. | Feb. 12, 1957 |
| 2,912,318 | Kiewig | Nov. 10, 1959 |